US007650502B2

(12) United States Patent
Sheymov

(10) Patent No.: US 7,650,502 B2
(45) Date of Patent: *Jan. 19, 2010

(54) METHOD OF COMMUNICATIONS AND COMMUNICATION NETWORK INTRUSION PROTECTION METHODS AND INTRUSION ATTEMPT DETECTION SYSTEM

(75) Inventor: Victor I. Sheymov, Vienna, VA (US)

(73) Assignee: Invicta Networks, Inc., Reston, VA (US)

( * ) Notice: Subject to any disclaimer, the term of this patent is extended or adjusted under 35 U.S.C. 154(b) by 358 days.

This patent is subject to a terminal disclaimer.

(21) Appl. No.: 11/712,458

(22) Filed: Mar. 1, 2007

(65) Prior Publication Data

US 2007/0162754 A1 Jul. 12, 2007

Related U.S. Application Data

(63) Continuation of application No. 11/094,249, filed on Mar. 31, 2005, now Pat. No. 7,506,166, which is a continuation of application No. 09/571,377, filed on May 15, 2000, now Pat. No. 6,981,146.

(60) Provisional application No. 60/134,547, filed on May 17, 1999.

(51) Int. Cl.
*H04L 9/32* (2006.01)
(52) U.S. Cl. ............ 713/172; 713/168; 380/273; 726/4
(58) Field of Classification Search ............ 713/172, 713/168; 380/273; 726/4
See application file for complete search history.

(56) References Cited

U.S. PATENT DOCUMENTS 4,334,322 A 6/1982 Clark, III

| 4,800,590 A | 1/1989 | Vaughan |
| 5,278,901 A | 1/1994 | Shieh et al. |
| 5,517,567 A | 5/1996 | Epstein |
| 5,537,099 A | 7/1996 | Liang |
| 5,659,615 A | 8/1997 | Dillon |
| 5,678,002 A | 10/1997 | Fawcett et al. |
| 5,742,666 A | 4/1998 | Alpert |
| 5,796,942 A | 8/1998 | Esbensen |
| 5,805,801 A | 9/1998 | Holloway et al. |

(Continued)

OTHER PUBLICATIONS

Dahlia Malkhi, et al.; "Secure Execution of Java Applets Using a Remote Playground"; AT&T Labs Research, Florham Park, NJ; 1988 IEEE; pp. 40-51.
John Pescatore; "Secure Use of the World Wide Web: Keeping Browsers and Servers From Getting Snared"; Trusted Information System; ISBN# 0-7803-3277-6; pp. 36-38.

(Continued)

*Primary Examiner*—Jacob Lipman
(74) *Attorney, Agent, or Firm*—Carlos R. Villimar; Roberts Mlotkowski Safran & Cole PC

(57) ABSTRACT

A method, system and computer readable medium for protecting a communications device connected to a communications system against an unauthorized intrusion, including providing a variable identifier to the communications device and entities authorized access thereto. The variable identifier is provided to a user address book and assigned with a permanent identifier and the permanent identifier, but not the variable identifier, is available to a user. The presence or absence of the correct variable identifier is sensed during an attempt to access the communications device for granting or denying access to the communications device. A new variable identifier is periodically provided to the communications device and to the authorized entities and to the user address book and assigned with the permanent identifier, wherein the permanent identifier, but not the new variable identifier, is available to the user.

21 Claims, 6 Drawing Sheets

U.S. PATENT DOCUMENTS

| | | |
|---|---|---|
| 5,892,903 A | 4/1999 | Klaus |
| 5,898,830 A | 4/1999 | Wesinger, Jr. et al. |
| 5,905,859 A | 5/1999 | Holloway et al. |
| 5,991,881 A | 11/1999 | Conklin et al. |
| 6,128,742 A | 10/2000 | Felt |
| 6,981,146 B1 | 12/2005 | Sheymov |
| 7,506,166 B2 | 3/2009 | Sheymov |

OTHER PUBLICATIONS

RSA Security; "Are Passwords Really Free? A Closer Look at the Hidden Costs of Password Security"; pp. 1-8.

RFC: 2516, Mamakos, et al.; "A Method for Transmitting PPP Over Ethernet (PPPoE)", Feb. 1999; pp. 1-17.

European Patent Office European Search Report for Patent Application No. EP 05 2555; Mailed Apr. 29, 2008.

U.S. Appl. No. 12/368,348, filed Feb. 10, 2009.

FIG. 1
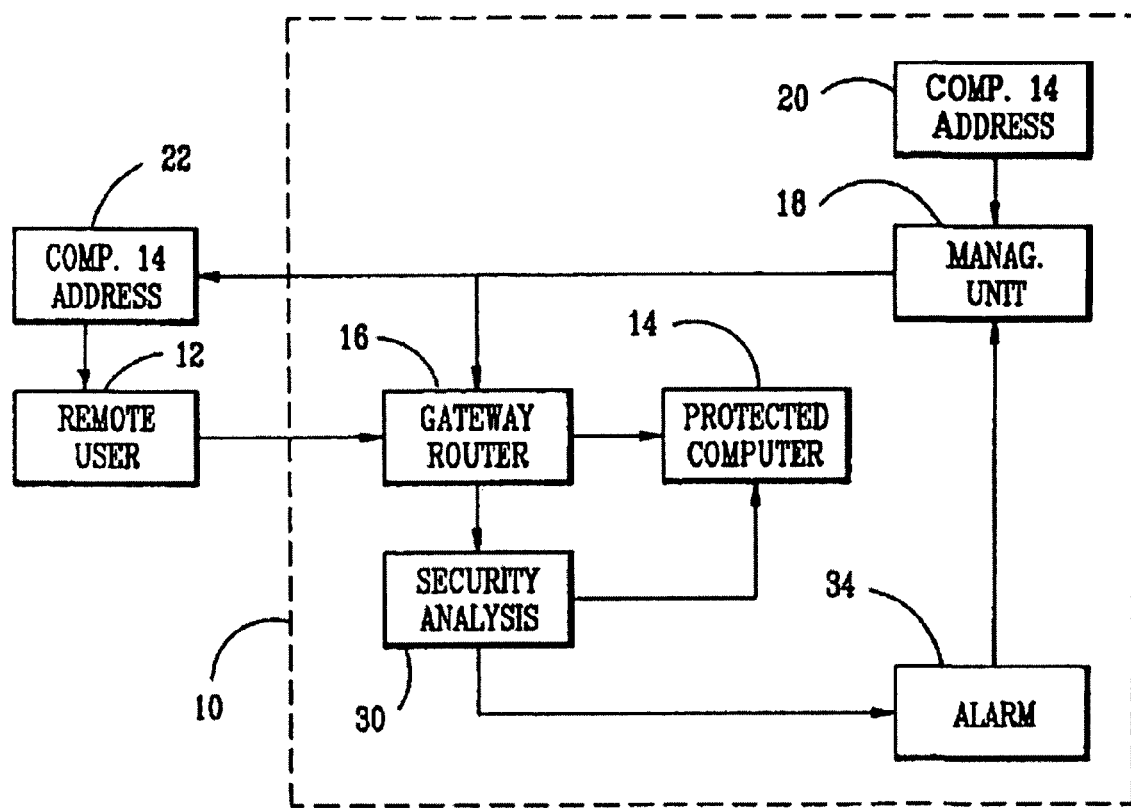
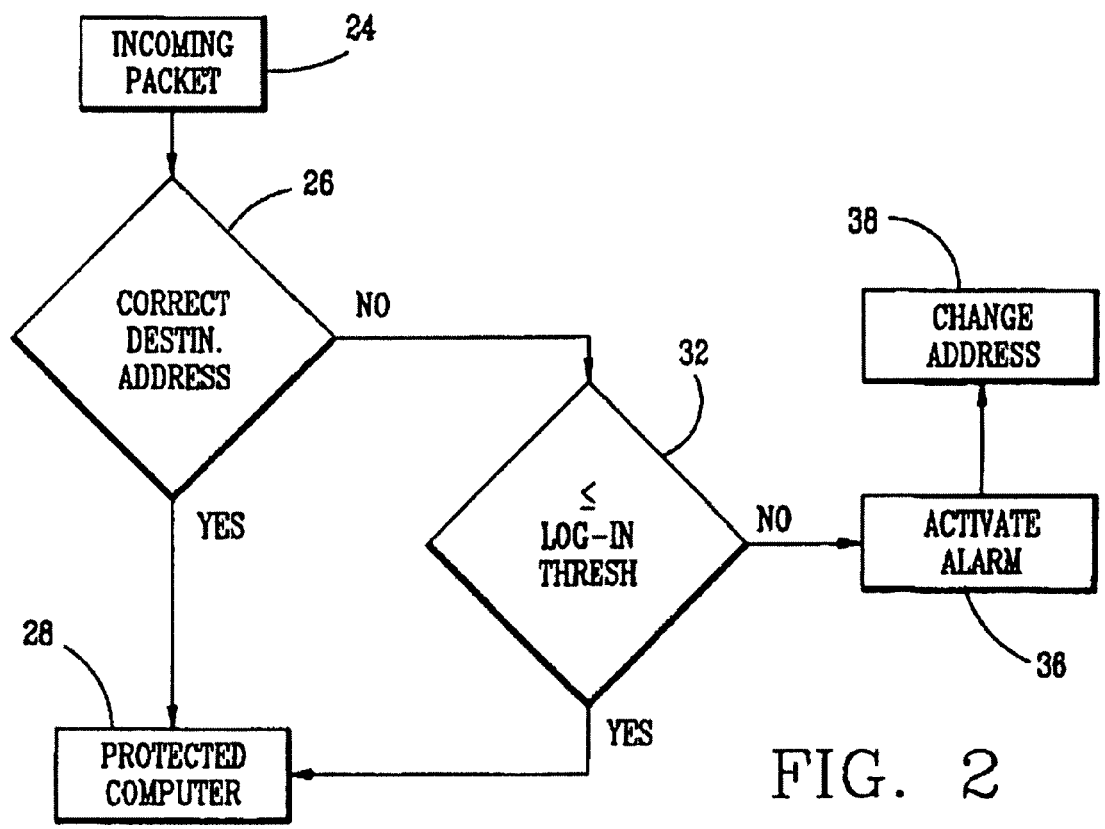
FIG. 2

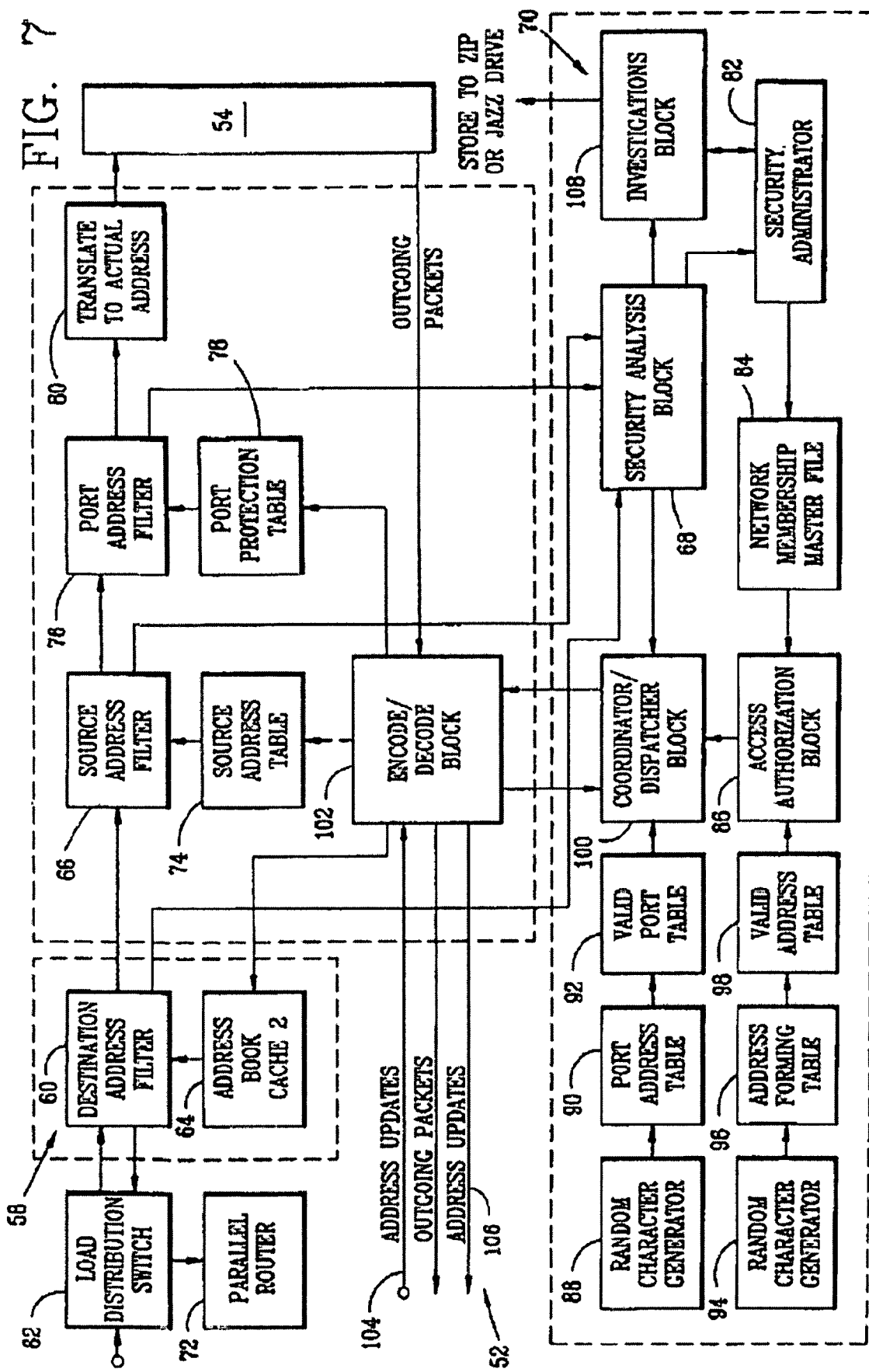

METHOD OF COMMUNICATIONS AND COMMUNICATION NETWORK INTRUSION PROTECTION METHODS AND INTRUSION ATTEMPT DETECTION SYSTEM

RELATED CASE INFORMATION

This application is a continuation of U.S. patent application Ser. No. 11/094,249, filed Mar. 31, 2005, now U.S. Pat. No. 7,506,166 which is a continuation of U.S. patent application Ser. No. 09/571,377, filed May 15, 2000, now U.S. Pat. No. 6,981,146, which claimed priority to U.S. Provisional Application No. 60/134,547, filed May 17, 1999, the disclosures of which are hereby incorporated by reference in their entirety.

BACKGROUND OF THE INVENTION

1. Field of the Invention

The invention relates generally to a method of communications and communication network intrusion protection methods and intrusion attempt detection system.

2. Discussion of the Background

Historically, every technology begins its evolution focusing mainly on performance parameters, and only at a certain developmental stage does it address the security aspects of its applications. Computer and communications networks follow this pattern in a classic way. For instance, first priorities in development of the Internet were reliability, survivability, optimization of the use of communications channels, and maximization of their speed and capacity. With a notable exception of some government systems, communications security was not an early high priority, if at all. Indeed, with a relatively low number of users at initial stages of Internet development, as well as with their exclusive nature, problems of potential cyber attacks would have been almost unnatural to address, considering the magnitude of other technical and organizational problems to overcome at that time. Furthermore, one of the ideas of the Internet was "democratization" of communications channels and of access to information, which is almost contradictory to the concept of security. Now we are faced with a situation, which requires adequate levels of security in communications while preserving already achieved "democratization" of communications channels and access to information.

All the initial objectives of the original developers of the Internet were achieved with results spectacular enough to almost certainly surpass their expectations. One of the most remarkable results of the Internet development to date is the mentioned "democratization". However in its unguarded way "democratization" apparently is either premature to a certain percentage of the Internet users, or contrary to human nature, or both. The fact remains that this very percentage of users presents a serious threat to the integrity of national critical infrastructure, to privacy of information, and to further advance of commerce by utilization of the Internet capabilities. At this stage it seems crucial to address security issues but, as usual, it is desirable to be done within already existing structures and technological conventions.

Existing communications protocols, while streamlining communications, still lack underlying entropy sufficient for security purposes. One way to increase entropy, of course, is encryption as illustrated by U.S. Pat. No. 5,742,666 to Finley. Here each node in the Internet encrypts the destination address with a code which only the next node can unscramble.

Encryption alone has not proven to be a viable security solution for many communications applications. Even within its core purpose, encryption still retains certain security problems, including distribution and safeguarding of the keys. Besides, encryption represents a "ballast", substantially reducing information processing speed and transfer time. These factors discourage its use in many borderline cases.

Another way is the use of the passwords. This method has been sufficient against humans, but it is clearly not working against computers. Any security success of the password-based security is temporary at best. Rapid advances in computing power make even the most sophisticated password arrangement a short-term solution.

Recent studies clearly indicate that the firewall technology, as illustrated by U.S. Pat. No. 5,898,830 to Wesinger et al., also does not provide a sufficient long-term solution to the security problem. While useful to some extent, it cannot alone withstand the modern levels of intrusion cyber attacks.

On the top of everything else, none of the existing security methods, including encryption, provides protection against denial of service attacks. Protection against denial of service attacks has become a critical aspect of communication system security. All existing log-on security systems, including those using encryption, are practically defenseless against such attacks. Given a malicious intent of a potential attacker, it is reasonable to assume that, even having failed with an intrusion attempt, the attacker is still capable of doing harm by disabling the system with a denial of service attack. Since existing systems by definition have to deal with every log-on attempt, legitimate or not, it is certain that these systems cannot defend themselves against a denial of service attack.

The deficiencies of existing security methods for protecting communications systems leads to the conclusion that a new generation of cyber protection technology is needed to achieve acceptable levels of security in network communications.

SUMMARY OF THE INVENTION

The exemplary embodiments of the present invention provides a novel and improved method of communications, and a novel and improved communication network intrusion protection method and systems and novel and improved intrusion attempt detection method and systems, adapted for use with a wide variety of communication networks including Internet based computers, corporate and organizational computer networks (LANs), e-commerce systems, wireless computer communications networks, telephone dial-up systems, wireless dial-up systems, wireless telephone and computer communications systems, cellular and satellite telephone systems, mobile telephone and mobile communications systems, cable based systems and computer databases, as well as protection of network nodes such as routers, switches, gateways, bridges, and frame relays.

Another aspect of the present invention is to provide a novel and improved communication network intrusion protection method and system which provides address agility combined with a limited allowable number of log-on attempts.

Yet another aspect of the present invention is to provide a novel and improved intrusion protection method for a wide variety of communication and other devices which may be accessed by a number, address code, and/or access code. This number, address code, and/or access code is periodically changed and the new number, address code, or access code is provided only to authorized users. The new number, address code, or access code may be provided to a computer or a device for the authorized user and not be accessible to others.

This identifier causes the user's computer to transmit the otherwise unknown and inaccessible number, address code, and/or access code.

A still further aspect of the present invention is to provide a novel and improved communication network intrusion protection method and system wherein a plurality of different cyber coordinates must be correctly provided before access is granted to a protected communications unit or a particular piece of information. If all or some cyber coordinates are not correctly provided, access is denied, an alarm situation is instigated and the affected cyber coordinates may be instantly changed.

For the purposes of this invention cyber coordinates are defined as a set of statements determining location of an object (such as a computer) or a piece of information (such as a computer file) in cyber space. Cyber coordinates include but are not limited to private or public protocol network addresses such as an IP address in the Internet, a computer port number or designator, a computer or database directory, a file name or designator, a telephone number, an access number and/or code, etc.

These and other aspects of the present invention are achieved by providing a communication network intrusion protection method and system where a potential intruder must first guess where a target computer such as a host workstation is in cyber space and to predict where the target computer such as a workstation will next be located in cyber space. This is achieved by changing a cyber coordinate (the address) or a plurality of cyber coordinates for the computers such as workstations on a determined or random time schedule and making an unscheduled cyber coordinates change when the system detects an intrusion attempt. A limited number of log-on attempts may be permitted before an intrusion attempt is confirmed and the cyber coordinates are changed. A management unit is provided for generating a random sequence of cyber coordinates and which maintains a series of tables containing current and the next set of addresses. These addresses are distributed to authorized parties, usually with use of an encryption process.

The present invention further provides for a piece of information, a computer or a database intrusion protection method and system where a potential intruder must first guess where a target piece of information such as a computer file or a directory is in cyber space and to predict where the target piece of information will be next in cyber space. This is achieved by changing a cyber coordinate or a plurality of cyber coordinates for the piece of information on a determined or random time schedule and making an unscheduled cyber coordinates change when the system detects an intrusion attempt. A limited number of log-on attempts may be permitted before an intrusion attempt is confirmed and the coordinates changed. A management unit is provided for generating a random sequence of cyber coordinates and which maintains a series of tables containing current and the next set of cyber coordinates. These coordinates are distributed to authorized parties, usually by means of an encryption process.

The intrusion attempt detection methods and systems are provided to the protected devices and pieces of information as described above by means of categorizing a log-on attempt when all or some of the correct cyber coordinates are not present as an intrusion attempt and by instigating an alarm situation.

BRIEF DESCRIPTION OF THE DRAWINGS

FIG. 1 is a block diagram of the communication network protection system of the present invention.

FIG. 2 is a flow diagram showing the operation of the system of FIG. 1.

FIG. 7 is a block diagram of a fourth embodiment of the communication network protection system of the present invention.

DESCRIPTION OF THE PREFERRED EMBODIMENTS

Figure 3:
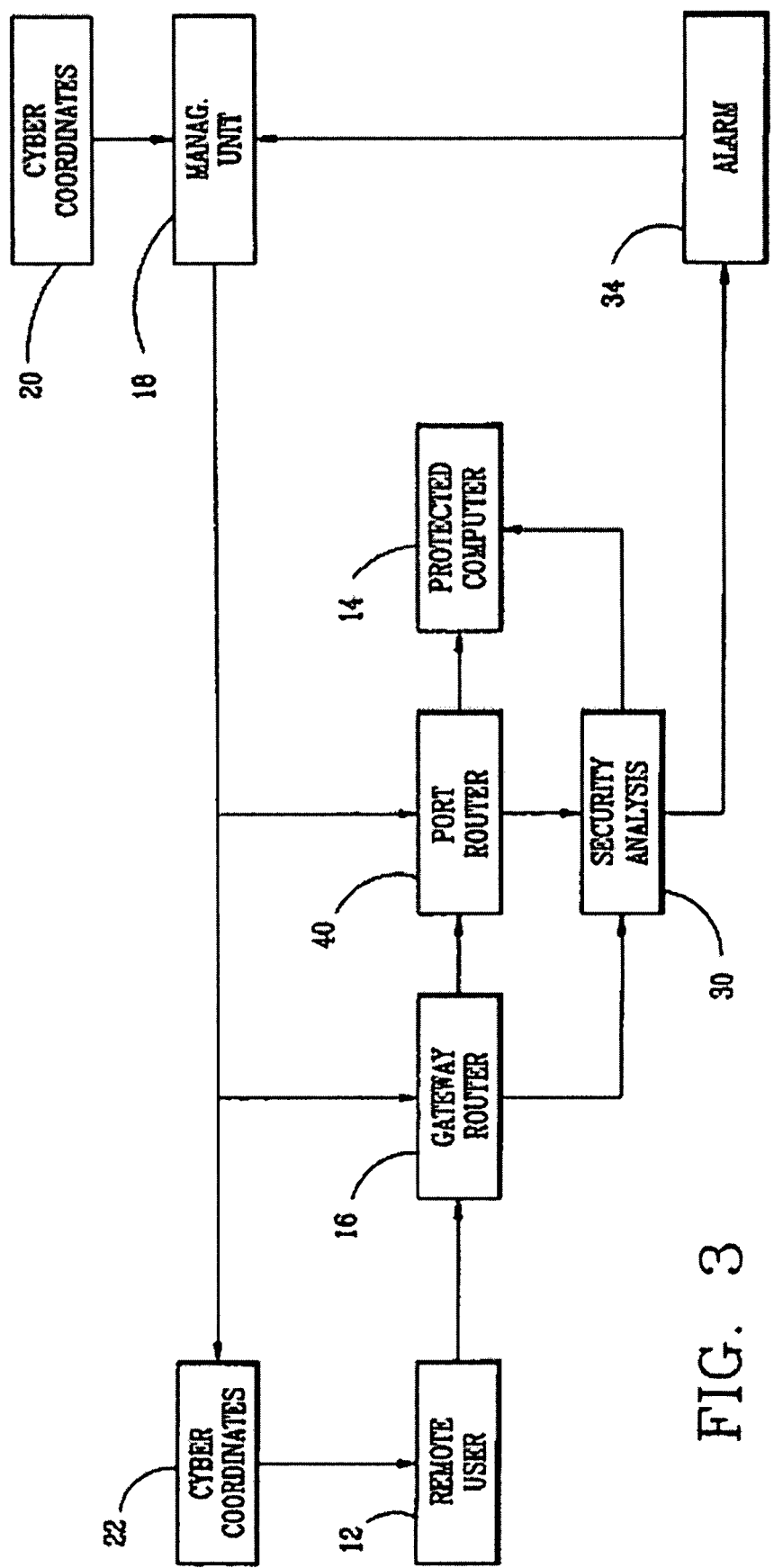
FIG. 3 is a block diagram of a second embodiment of the communication network protection system of the present invention.

Existing communications systems use fixed coordinates in cyber space for the communications source and communications receiver. Commonly accepted terminology for the Internet refers to these cyber coordinates as source and destination IP addresses. For purposes of an unauthorized intrusion into these communication systems, the situation of a cyber attack might be described in military terms as shooting at a stationary target positioned at known coordinates in cyber space. Obviously, a moving target is more secure than the stationary one, and a moving target with coordinates unknown to the intruder is more secure yet. The method of the present invention takes advantage of the cyber space environment and the fact that the correlation between the physical coordinates of computers or other communication devices and their cyber coordinates is insignificant.

While it is difficult to change the physical coordinates of computers or other communications devices, their cyber coordinates (cyber addresses) can be changed much easier, and in accordance with the present invention, may be variable and changing over time. In addition to varying the cyber coordinates over time, the cyber coordinates can immediately be changed when an attempted intrusion is sensed. Furthermore, making the current cyber coordinates available to only authorized parties makes a computer or other communications device a moving target with cyber coordinates unknown to potential attackers. In effect, this method creates a device which perpetually moves in cyber space.

Considering first the method of the present invention as applied to computers and computer networks, the computer's current cyber address may serve also as its initial log-on password with a difference that this initial log-on password is variable. A user, however, has to deal only with a computer's permanent identifier, which is, effectively its assigned "name" within a corresponding network. Any permanent identifier system can be used, and an alphabetic "name" system seems to be reasonably user-friendly. One of such arrangements would call for using a computer's alphabetic Domain Name System, as a cyber address permanent identifier, while subjecting its numeric, or any other cyber address to a periodic change with regular or irregular intervals. This separation will make the security system transparent to the user, who will have to deal only with the alphabetic addresses. In effect, the user's computer would contain an "address book" where the alphabetic addresses are permanent, and the corresponding variable addresses are more complex and periodically updated by a network's management. While a user is working with other members of the network on the name or the alphabetic address basis, the computer conducts communications based on the corresponding variable numeric or other addresses assigned for that particular time.

A variable address system can relatively easily be made to contain virtually any level of entropy, and certainly enough entropy to defy most sophisticated attacks. Obviously, the level of protection is directly related to the level of entropy contained in the variable address system and to the frequency of the cyber address change.

This scenario places a potential attacker in a very difficult situation when he has to find the target before launching an attack. If a restriction on a number of allowable log-on tries is implemented, it becomes more difficult for an attacker to find the target than to actually attack it. This task of locating the target can be made difficult if a network's cyber address system contains sufficient entropy. This difficulty is greatly increased if the security system also limits the number of allowable log-on tries, significantly raising the entropy density.

For the purpose of this invention, entropy density is defined as entropy per one attempt to guess a value of a random variable.

FIG. 1 illustrates a simple computer intrusion protection system 10 which operates in accordance with the method of the present invention. Here, a remote user's computer 12 is connected to a protected computer 14 by a gateway router or bridge 16. A management system 18 periodically changes the address for the computer 14 by providing a new address from a cyber address book 20 which stores a plurality of cyber addresses. Each new cyber address is provided by the management system 18 to the router 16 and to a user computer address book 22. The address book 22 contains both the alphabetic destination address for the computer 14 which is available to the user and the variable numeric cyber address which is not available to the user. When the user wants to transmit a packet of information with the alphabetic address for the computer 14, this alphabetic address is automatically substituted for the current numerical cyber address and used in the packet.

With the reference to FIGS. 1 and 2, when a packet is received by the gateway router or bridge 16 as indicated at 24, the cyber address is checked by the gateway router or bridge at 26, and if the destination address is correct, the packet is passed at 28 to the computer 14. If the destination address is not correct, the packet is directed to a security analysis section 30 which, at 32 determines if the packet is retransmitted with a correct address within a limited number of log-in attempts. If this occurs, the security analysis section transmits the packet to the computer 14 at 28. However, if no correct address is received within the allowed limited number of log-in attempts, the packet is not transmitted to the computer 14 and the security analysis section activates an alarm section 34 at 36 which in turn causes the management section to immediately operate at 38 to change the cyber address.

Sophisticated cyber attacks often include intrusion through computer ports other than the port intended for a client log-on. If a system principally described in connection with FIGS. 1 and 2 is implemented, the port vulnerability still represents an opening for an attack from within the network, that is if an attacker has even a low-level authorized access to a particular computer and thus knows its current variable address.

Computer ports can be protected in a way similar to protection of the computer itself. In this case port assignment for the computer becomes variable and is changed periodically in a manner similar to that described in connection with FIGS. 1 and 2. Then, a current assignment of a particular port is communicated only to appropriate parties and is not known to others. At the same time, similarly to methods described, a computer user would deal with permanent port assignments, which would serve as the ports' permanent "names".

This arrangement in itself may not be sufficient, however, to reliably protect against a port attack using substantial computing power because of a possible insufficient entropy density. Such a protection can be achieved by implementing an internal computer "port router" which would serve essentially the same role for port identifiers as the common gateway router or bridge 16 serves for computer destination addresses.

Figure 4:
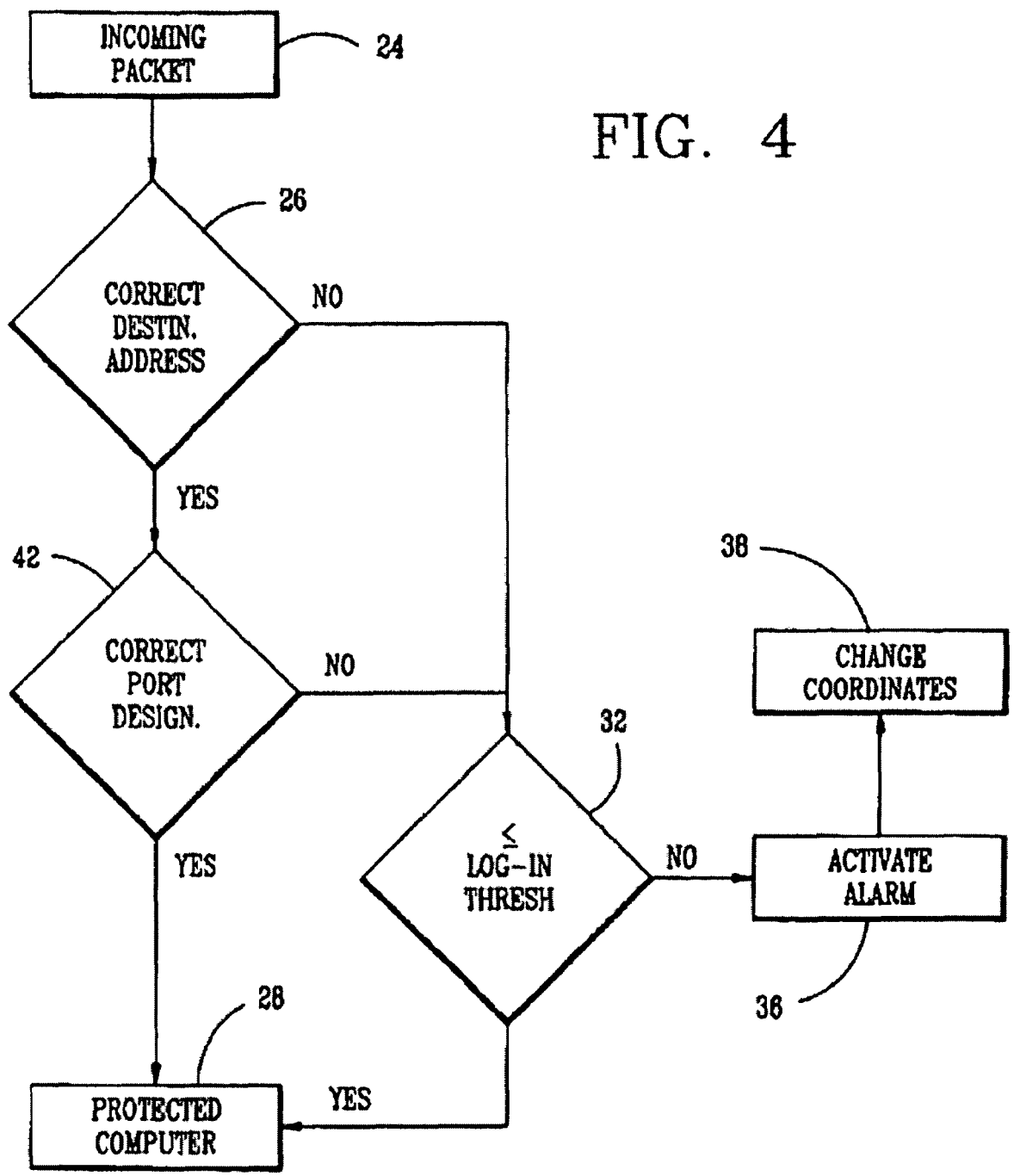
FIG. 4 is a flow diagram showing the operation of the system of FIG. 3.

With reference to FIGS. 3 and 4 wherein like reference numerals are used for components and operations which are the same as those previously described in connection with FIGS. 1 and 2, a port router 40 is provided prior to the protected computer 14, and this port router is provided with a port number or designator by the management unit 18. This port number or designator is also provided to the user address book 22 and will be changed when the cyber address is changed, or separately. Thus, with reference to FIG. 4, once the cyber address has been cleared at 26, the port number or designator is examined at 42. If the port number is also correct, the data packet will be passed to the computer 14 at 28. If the port number is initially incorrect, the packet is directed to the security analysis section 30 which at 32 determines if the packet is retransmitted with the correct port number within the limited number of log-in attempts.

The port protection feature can be used independently of other features of the system. It can effectively protect nodes of the infrastructure such as routers, gateways, bridges, and frame relays from unauthorized access. This can protect systems from an attacker staging a cyber attack from such nodes.

The method and system of the present invention may be adapted to provide security for both Internet based computer networks and private computer networks such as LANs.

Internet structure allows the creation of an Internet based Private Cyber Network (PCN) among a number of Internet-connected computers. The main concern for using the Internet for this purpose as an alternative to the actual private networks with dedicated communication channels is security of Internet-based networks.

The present invention facilitates establishment of adequate and controllable level of security for the PCNs. Furthermore, this new technology provides means for flexible structure of a PCN, allowing easy and practically instant changes in its membership. Furthermore, it allows preservation of adequate security in an environment where a computer could be a member of multiple PCNs with different security requirements. Utilizing the described concept, a protected computer becomes a "moving target" for the potential intruders where its cyber coordinates are periodically changed and the new coordinates are communicated on a "need to know" basis only to the other members of the PCN authorized to access this computer along with appropriate routers and gateways. This change of cyber coordinates can be performed either by previous arrangement or by communicating future addresses to the authorized members prior to the change. Feasible frequency of such a change can range from a low extreme of a stationary system changing cyber coordinates only upon detection of a cyber attack to an extremely high frequency such as with every packet. The future coordinates can be transmitted either encrypted or unencrypted. Furthermore, each change of position of each PCN member can be made random in terms of both its current cyber coordinates and the time of the coordinates change. These parameters of a protected PCN member's cyber moves are known only to the PCN management, other PCN members with authorization to communicate with this particular member, and appropriate gateways and routers. PCN management would implement and coordinate periodic cyber coordinates changes for all members of the PCN. While the PCN management is the logical party to make all the notification of the cyber coordinates changes, in certain instances it could be advantageous to shift a part of this task to a PCN member computer itself. With certain limitations, the routers and gateways with the "need to know" the current address of the protected computer are located in cyber space in the general vicinity of the protected computer. In such instances the protected computer could be in a better position to make the mentioned notifications of nearby routers and gateways.

The address changes could be done simultaneously for all the members of the PCN, or separately, particularly if security requirements for the members substantially differ. The latter method is advantageous, for instance, if some of the computers within the PCN are much more likely than others to be targeted by potential intruders. A retail banking PCN could be an example of such an arrangement where the bank's computer is much more likely to be attacked than a customer's computer. It should be noted that, while in certain cases some members of the PCN may not require any protection at all, it still is prudent to provide it as long as the computer belongs to a protected PCN. The correct "signature" of the current "return address" would serve as additional authenticity verification. In the above example of the retail banking, while many customers' computers may not require any protection, assigning variable addresses to them would serve as an additional assurance to the bank that every log-on is authorized. In fact, this system automatically provides two-tier security. In order to reach a protected computer, the client computer has to know the server computer current cyber address in the first place. Then, even if a potential intruder against odds "hits" the correct current address the information packet is screened for the correct "signature" or return address. If that signature does not belong to the list of the PCN's current addresses, the packet is rejected. In high security instances this should trigger an unscheduled address change of the protected computer.

Figure 5:
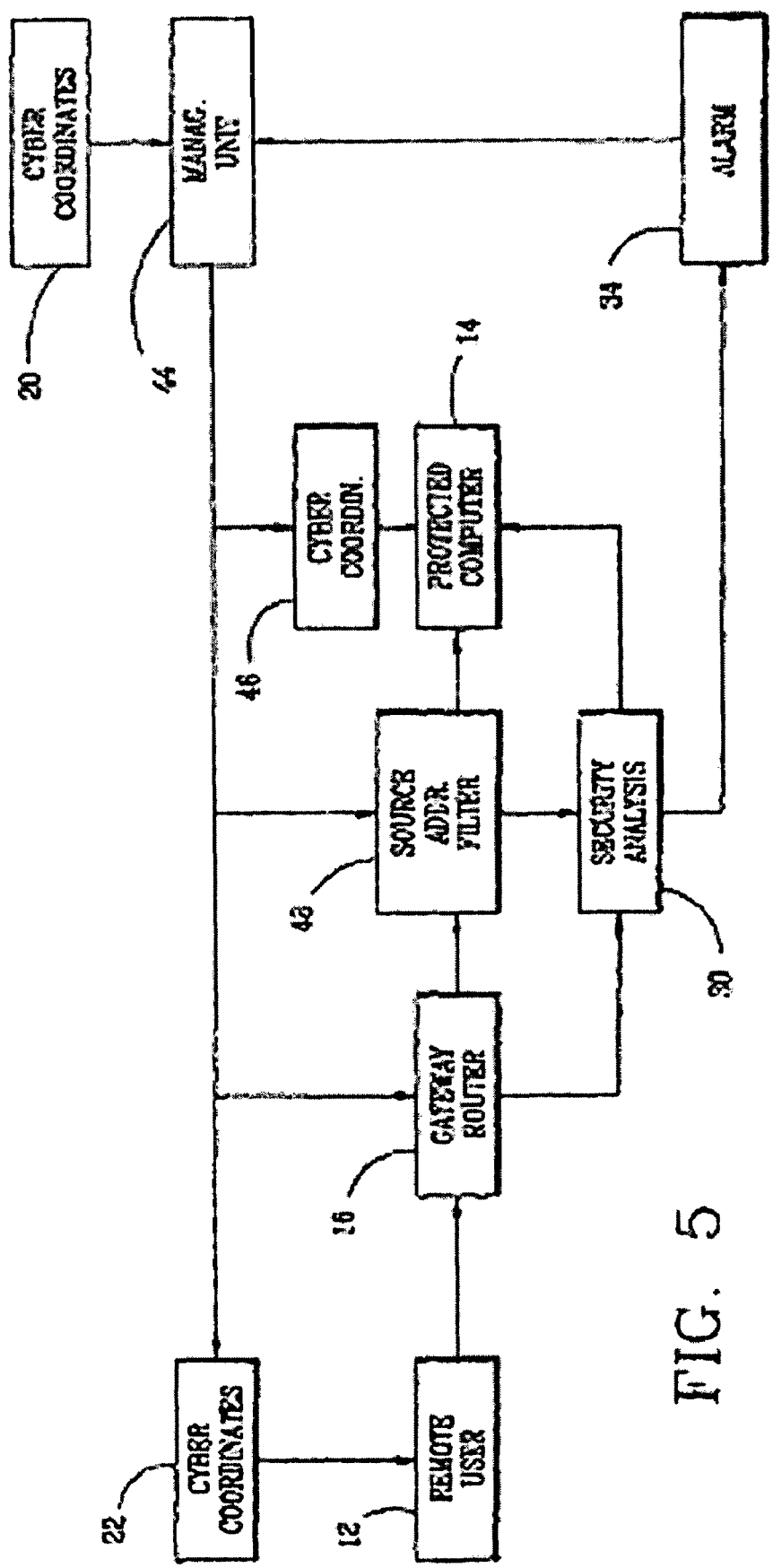
FIG. 5 is a block diagram of a third embodiment of the communication network protection system of the present invention.
Figure 6:
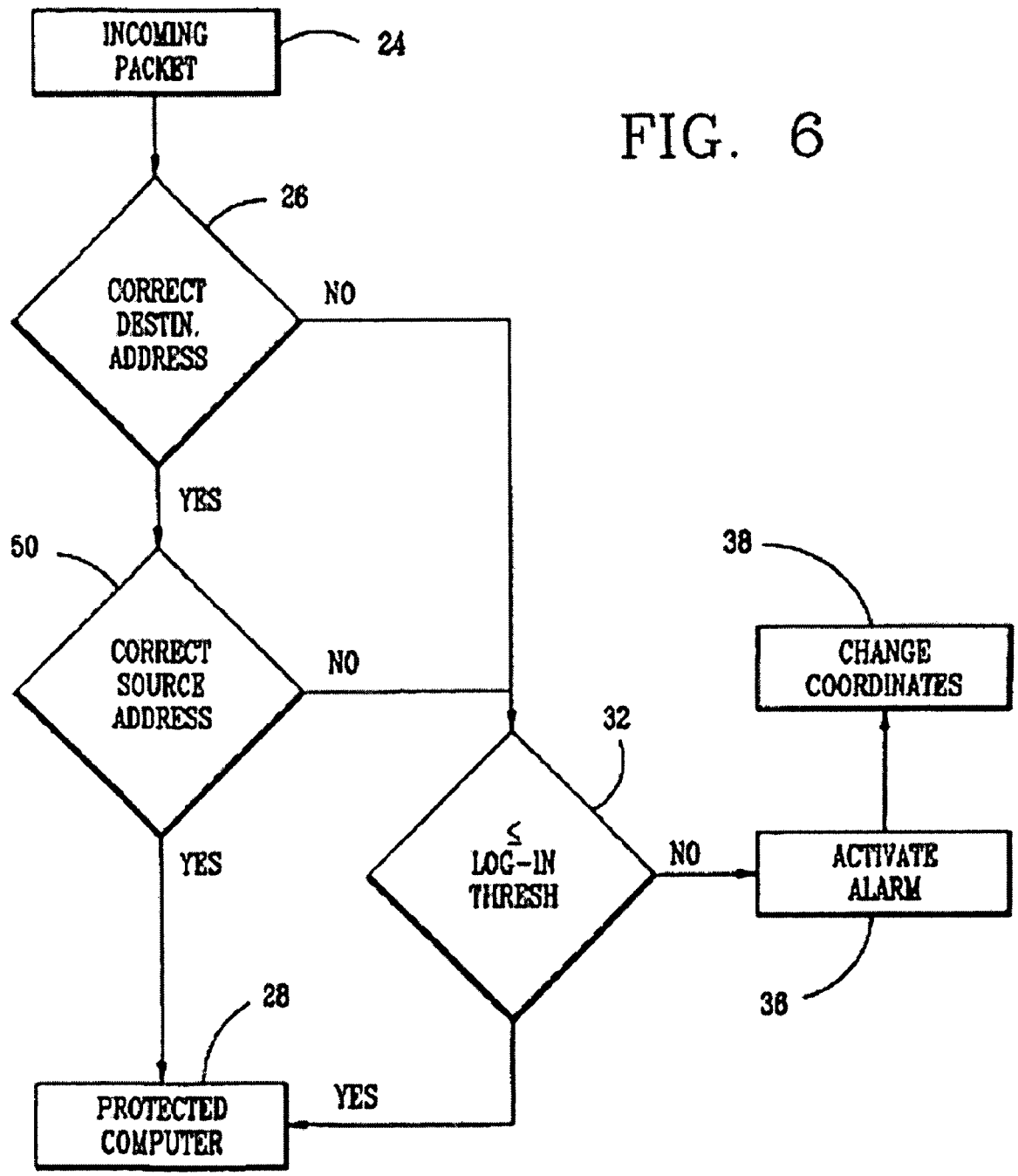
FIG. 6 is a flow diagram showing the operation of the system of FIG. 5.

With the reference to FIGS. 5 and 6 which illustrate this two-tier security system, a network management unit 44 provides different unique cyber coordinates to the address books for each computer in the system (two computers 12 and 14 with address books 22 and 46 respectively being shown). Now when the computer 12 sends a data packet to the computer 14, the gateway router or bridge 16, first checks for the correct current destination address for the computer 14 at 26 in the manner previously described. If the destination address is correct, a source address sensor 48 checks at 50 to determine if the correct source address (i.e. return address) for the computer 12 is also present. If both correct addresses are present, the data packet is passed to the computer 14 at 28, but if the correct source address is not present, the data packet is passed to the security analysis section 30 where at 32 where it is determined if a correct source address is received within the acceptable number of log-on tries. If the correct return address is not received, an alarm situation is activated at 36 and the network management system operates at 38 to change the cyber address of the computer 14.

In addition to the penetration (hacking) detection and protection, the system above provides real-time detection of a cyber attack and protection against "flooding" denial of service attacks. A gateway router or bridge 16 filters all the incorrectly addressed packets thus protecting against "flooding". Further yet, since the "address book" of the protected network contains only trusted destinations, this system also protects against instructive viruses or worms if such are present or introduced into the network. For the purpose of this invention, an instructive virus or worm is defined as a foreign unit of software introduced into a computer system so it sends certain computer data to otherwise unauthorized parties outside of the system.

Elements of the system described above are: a gateway router or bridge 16, a computer protection unit, and a management unit. A gateway router or bridge represents an element of collective defense for the network, while the source address filter and the "port router" and filter represent a unit of individual defense for a member computer. This individual defense unit (server unit) can be implemented either as a standalone computer, as a card in the protected computer, as software in the protected computer, or imbedded into the protected computer operating system. For further improvement of the overall security, port assignments can be generated autonomously from the management unit thus creating a "two keys" system in a cryptographic sense. This would allow for security to still be in place even if a security breach happened at the security management level.

The method and system of the present invention minimize human involvement in the system. The system can be configured in such a way that computer users deal only with simple identifiers or names permanently assigned to every computer in the network. All the real (current) cyber coordinates can be stored separately and be inaccessible to the user, and could be available to the appropriate computers only. This approach both enhances security and makes this security system transparent to the user. The user deals only with the simple alphabetic side of the "address book", and is not bothered with the inner workings of the security system. A telephone equivalent of this configuration is an electronic white pages residing in a computerized telephone set, which is automatically updated by the telephone company. The user just has to find a name, and push the "connect" button while the telephone set does the rest of the task.

A numeric cyber address system, based on the Internet host number could be relatively easily utilized for the discussed security purposes, however a limitation exists for this address system in its current form represented by the IPv.4 protocol. This limitation is posed by the fact that the address is represented by a 32-bit number. 32-bit format does not contain sufficient entropy in the address system to enable establishment of adequate security. This is a particularly serious limitation in regard to securing an entire network. The availability of the network numbers are limited to the extent that not only entropy, but a simple permanently assigned number is becoming more and more difficult to obtain with the rapid expansion of the Internet.

If this address system is to be used for the security purposes, than the format of the host number should be adequately expanded to create sufficient size of the address numbers field in the system. If this is done, than the corresponding address in the Domain Name System (DNS) could be conveniently used as permanent identifier for a particular computer and the Internet host number would be variable, creating a moving regime of a protected computer. Currently being implemented IPv.6 (IPNG) protocol solves this problem by providing sufficient entropy.

Another way to achieve the same goal is to use the DNS address as a variable for security purposes. This way, the traditional Internet DNS address system would not be affected and no change in format is required. The relevant part of the protected computer's DNS address would become a variable, utilizing more characters than the alphabet, with a very large number of variations, also creating sufficient level of entropy.

Yet another way to implement the same method is to utilize the geographic zone-based system. While its utilization is somewhat similar to the DNS system, it offers some practical advantages for security use. Naturally, when a computer is protected by a security system, it is still essential to preserve the communication redundancy of the Internet communications. However, the redundancy may suffer if only a limited number of the routers and gateways are informed of the protected computer current cyber address. This effect could be particularly important with the members of a particular protected network vastly remote in geographic terms. The necessary notification of a large number of the routers and gateways can also become problematic, not only technically, but also because it can decrease the level of security. In this sense a geographic zone-based system offers advantages since the variable part of the computer's cyber address could be made to involve only certain geographic locale while initial routing of the information packet could be done by the traditional method. After the packet has been moved to the general vicinity of the addressee computer, it would get into the area of the "informed" routers and gateways. This scheme would simplify the notification process of the routers as well as improve security by limiting the number of the "need to know" parties. It is important to recognize that, after the "general" part of the cyber address caused the information packet to arrive in a cyber vicinity of the addressee, virtually any, even private, address system can be used for the rest of the delivery. This would further increase the level of underlying entropy in the system.

While certain specific address systems have been discussed, it is an important quality of the present invention that it can be implemented with virtually any address system.

Corporate and organizational computer networks such as LANs or, at least those in closed configurations, do not possess as much vulnerability to cyber attacks as Internet-based networks. However, even in these cases, their remote access security is a subject of concern. This is especially visible when a private network (PN) contains information of different levels of confidentiality with access restricted to appropriate parties. In other words, along with other generally accessible organizational information, an organizational PN can contain information restricted to certain limited groups. Enforcement of these restrictions requires a remote access security system. Usually these security systems employ a password-based scheme of one type or another and, perhaps, a firewall. However, reliance on passwords may not be entirely justified since the passwords can be lost or stolen, giving a malicious insider with a low access level a reasonable chance of access to information intended only for higher levels of access. Furthermore, in some cases use of cracking techniques from such a position is not entirely out of the question. Such an occurrence can relatively easily defeat both the password and the firewall. This would prevent a LAN from a cyber attack launched from within the network.

The present invention provides adequate security to such PCNs without reliance on the passwords and to limit access to only appropriate computers. Then, the task of overall information access security practically would be narrowed down to control of physical access to a particular computer, usually a less complicated feat.

Similarly to the systems described for Internet-based networks, a "closed" LAN as well as an Internet-based LAN can be protected by implementation of periodic changes of the members' network addresses and communicating those changes to the appropriate parties. This way, the lowest access level computers would have the lowest rate of address change. The rate of the address change would increase with the level of access. This system would ensure that all the PCN computers with legitimate access to a particular computer within the PCN would be informed of its location. Furthermore, it will ensure that the current location of a computer with restricted information would be unknown to the parties without the legitimate access clearance. For instance, a superior's computer would be able to access his subordinate's computer but not vice versa.

Also similarly to the systems described for the PCNs, a PCN computer would contain an "address book" where the user can see and use only the permanent side of it with identifiers of all computers accessible to him while the actual communication functions are performed by the computer using the variable side of the "address book" periodically updated by the PN management. To further enhance security, in addition to the computer address system management, the PCN Administrator can implement an automatic security monitoring system where all wrongly addressed log-on attempts would be registered and analyzed for security purposes.

Thus the method and system of the present invention would allow reliable protection against unauthorized remote access to information from within a PN while providing a great deal of flexibility, where the granted access can be revised easily and quickly.

A greatly enhanced intrusion protection system and method can be achieved by combining the operating systems of FIGS. 1-6. Now an arriving data packet would first be screened by a gateway router or a similar device for a correct destination address. If the destination address is correct, the packet is passed for further processing. If the destination address is incorrect, the alarm is triggered and the packet is passed to the network security managing unit for security analysis.

The packet with correct destination address is then screened for a correct source address. If the source address is correct, the packet is passed to the receiver computer. If the source address is incorrect, the alarm is triggered and the packet is passed to the network security managing unit for security analysis.

Then, the packet with a correct destination address and a correct source address is screened for a correct allowed port coordinate such as port number. If the port coordinate is correct, the packet is passed for further processing. If the port coordinate is incorrect, the alarm is triggered and the packet is passed to the network security managing unit for security analysis.

Finally, the packet with a correct destination and source addresses and a correct port designator is screened for data integrity by application of authentication check such as a checksum. If the authentication check is passed, the packet is passed to the addressee computer. If the authentication check is failed, the alarm is triggered and the packet is passed to the network security managing unit for security analysis.

The security managing unit analyses all the alarms and makes decisions on necessary unscheduled changes of addresses for appropriate network servers. Also, it can notify law enforcement and pass appropriate data on to it.

FIG. 7 illustrates an enhanced computer intrusion protection system indicated generally at 52 for one or more network computers 54. A gateway router or a bridge 58 includes a destination address filter 60 which receives data packets which pass in through a load distribution switch 62. A non-interrogatable network address book 64 stores current network server addresses for the destination address filter 60, and the destination address filter checks each data packet to determine if a legitimate destination address is present.

Packets with legitimate destination addresses are forwarded to a source address filter 66, while packets with illegitimate destination addresses are sent to a security analysis section 68 in a management unit 70.

When a preset traffic load level is reached indicating that an attempt at flooding is being made, the destination address filter causes the load distribution switch 62 to distribute traffic to one or more parallel gateway routers or bridges which collectively forward legitimate traffic and dump the flooding traffic. An alternative arrangement would call for the load distribution function to be done irrespective of the load, utilizing all the parallel gateways all the time. A source address table 74 stores accessible server's designators and corresponding current addresses for all system servers which may legitimately have access to the computer or computers 54. These addresses are accessed by the source address filter which determines whether or not an incoming data packet with the proper destination address originates from a source with a legitimate source address entered in the source address table 74. If the source address is determined to be legitimate, the data packet is passed to a port address filter 76. Data packets with an illegitimate source address are directed to the security analysis section 68. Alternatively, source address screening can be done at the gateway router or bridge 58 first prior to port filter 76.

A port protection table 78 includes the current port assignments for the computer or computers 54, and these port assignments are accessed by the port designator filter 76 which then determines if an incoming data packet contains legitimate port designation. If it does, it is passed to an actual address translator 80 which forwards the data packet to the specific computer or computers 54 which are to receive the packet. If an illegitimate port address is found by the port address filter 76, the data packet is transmitted to the security analysis section 68.

The management unit 70 is under the control of a security administrator 82. A network membership master file 84 stores a master list of legitimate server's designators along with respective authorized access lists and corresponding current cyber coordinates. The security administrator can update the master list by adding or removing authorized access for every protected computer. An access authorization unit 86 distributes the upgraded relevant portions of the master lists to the address books of the respective authorized servers.

A random character generator 88 generates random characters for use in forming current port designators, and provides these characters to a port designator forming block 90. This port designator forming block forms the next set of network current port designators in conjunction with the master list and these are incorporated for transmission by a port table block 92. Alternatively, port designators can be formed in the computer unit instead of the management unit.

Similarly, a random character generator 94 generates random characters for use in forming current server addresses, and provides these characters to a server address forming block 96. This server address forming block forms the next set of current network server addresses, and an address table 98 assigns addresses to servers designated on the master list.

A coordinator/dispatcher block 100 coordinates scheduled move of network servers to their next current addresses, provides the next set of network addresses for appropriate servers and routers and coordinates unscheduled changes of addresses on command from the security analysis unit 68. The coordinator/dispatcher block 100 may be connected to an encode/decode block 102 which decodes received address book upgrades from input 104 and encodes new port and server destination addresses to be sent to authorized servers in the system over output 106. Where encoding of new cyber coordinates is used, each authorized computer in the network will have a similar encoding/decoding unit.

The security analysis unit 68 analyses received illegitimate data packets and detects attack attempts. If needed, the security analysis unit orders the coordinator/dispatcher block 100 to provide an unscheduled address change and diverts the attack data packets to an investigation unit 108. This investigation unit simulates the target server keeping a dialog alive with the attacker to permit security personnel to engage and follow the progress of the attacker while tracing the origin of the attack.

Providing security against intrusion for e-commerce systems presents a unique problem, for an important peculiarity of an e-commerce system is that its address must be publicly known. This aspect represents a contradiction to the requirement of the address being known to authorized parties only. However, the only information intended for the general public usually relates to a company catalog and similar material. The rest of the information on a merchant's network is usually considered private and thus should be protected. Using this distinction, a merchant's e-commerce site should be split into two parts: public and private. The public part is set up on a public "catalog" server with a fixed IP address and should contain only information intended for the general public. The rest of the corporate information should be placed in a separate network and protected as described in relation to FIGS. 1-7.

When a customer has completed shopping and made purchasing decisions concerning the terms and price of the sale, pertinent for the transaction, information is placed in a separate register. This register is periodically swept by a server handling financial transactions ("financial" server), which belongs to the protected corporate network. In fact, the "catalog" server does not know the current address of the financial transactions server. Thus, even if an intruder penetrates the "catalog" server, the damage is limited to the contents of the catalog and the intruder cannot get an entry to the protected corporate network.

The financial server, having received pending transaction data, contacts the customer, offering a short-term temporary access for finalizing the transaction. In other words, the customer is allowed access just long enough to communicate pertinent financial data such as a credit card number and to receive a transaction confirmation at which point the session is terminated, the customer is diverted back to the catalog server and the financial server is moved to a new cyber address thus making obtained knowledge of its location during the transaction obsolete.

Dial-up communications systems, in respect to their infrastructure channels susceptibility to transmission intercept by unrelated parties, can be separated into two broad categories: easily interceptable, such as cellular and satellite telephone systems and relatively protected such as conventional land-line based telephone systems. Relatively protected systems such as conventional land-line based telephone systems can be protected in the following way. Phone numbers, assigned by a telephone company to a dial-up telephone-based private network serve as the members' computer addresses. As described previously, such a private network can be protected from unauthorized remote access by implementing periodic changes in the addresses, i.e. telephone numbers assigned to the members for transmission by the network along with other designators such as access codes and communicating the changed numbers to the appropriate parties.

For the conventional land-line dial-up telephone systems, while the "last mile" connection remains constant, the assigned telephone number is periodically changed, making the corresponding computer a moving target for a potential attacker. In this case the telephone company serves as the security system manager. It assigns the current variable telephone numbers to the members of a protected, private network, performs notification of all the appropriate parties, and changes the members' current numbers to a new set at an appropriate time. The telephone company switches naturally serve in the role of routers, and thus they can be programmed to perform surveillance of the system, to detect potential intrusion attacks and to issue appropriate alarms.

Periodically changing the current assigned numbers creates system entropy for a potential intruder, making unauthorized access difficult. Obviously, the implementation of this security system is dependent on availability of sufficient vacant numbers at a particular facility of the telephone company. Furthermore, for a variety of practical reasons it is advisable to keep a just vacated number unassigned for a certain period of time. All this may require additional number capacity at the telephone company facility in order to enable it to provide remote access security to a larger number of personal networks while preserving a comfortable level of system entropy.

If the mentioned additional capacity is not available, or a still higher level of entropy is desired, it could be artificially increased by adding an access code to the assigned number. This would amount to adding virtual capacity to the system, and would make a combination of the phone number and access code an equivalent of a computer's telephone address. In effect, this would make a dialed number larger than the conventional format. This method makes a virtual number capacity practically unlimited and, since the process is handled by computers without human involvement, it should not put any additional burden on a user. With or without a virtual number capacity, utilization of this method allows the intrusion attempts to be easily identified by their wrong number and/or code. At the same time, implementation of this system might require some changes in dialing protocols as well as additional capabilities of the telephone switching equipment.

Entropy density can be increased by limiting the number of allowable connection attempts. Similarly to the method described previously, telephone company switching equipment can be made to perform a role of an outside security barrier for the private network. In this case wrongly addressed connection attempts should be analyzed in order to detect possible "sweeping". If such an attempt is detected, tracing the origin of the attempt and notifying the appropriate phone company should not present a problem even with the existing technology.

The simplest form of private network protection under the proposed method and system is when at a predetermined time all the members of a particular network are switched to the new "telephone book" of the network. However, in some cases required level of security for some members of the same private network could substantially differ, or they may face different levels of security risk. In such cases frequency of the phone number change could be set individually with appropriate notification of the other members of the network. This differentiation enables the telephone company to offer differentiated levels of security protection to its customers even within the same private network.

A telephone company can also offer its customers protected voice private networks which would provide a higher level of privacy protection than the presently used "unlisted numbers." In this configuration the customers' telephone sets are equipped with a computerized dialing device with remotely upgradeable memory which would allow each member of a protected voice network to contain the network "telephone book" and that book is periodically updated by the telephone company.

The telephone company would periodically change the assigned telephone numbers of a protected network to a new set of current numbers. These new numbers would be communicated to the members of a protected voice network through updating their computerized dialing devices.

As a derivative of the described system, an updateable electronic telephone directory system can be also implemented. In this case a customer's phone set would include a computerized dialing device with electronic memory containing a conventional telephone directory and a personal directory as well. This telephone directory can be periodically updated on-line by the telephone company.

Easily interceptable systems such as cellular and satellite telephone systems, in addition to the protection described above, can be protected from "cloning" when their signals can be intercepted and the "identity" of the phone can be cloned for gaining unauthorized access and use of the system by unauthorized parties.

Mobile telephone and mobile communications systems are protected in a manner similar to networks or land based telephone systems. In this instance, the novel and improved method of changing cyber coordinates is designed to reliably protect mobile phone systems from unauthorized use commonly known as cloning as well as to make intercept of wireless communications more difficult than it is at present. With this system the static wireless phone number or other similar identifier is not used for identification and authorization. Instead, a set of private identifiers is generated known only to the phone company and base stations controlling mobile phone calls and used to continually update the mobile phone and base station directories with current valid identifiers. This approach provides vastly superior protection over current methods requiring that each call be intercepted in order to track and keep current with changing identifiers. Immediate detection of unauthorized attempts to use a cloned phone is realized and law enforcement may be notified in near real time for appropriate action.

Other electronic devices using wireless communications can be protected by the methods and systems described above.

Finally, computers often contain databases with a variety of information. That information in a database often has wide-ranging levels of sensitivity or commercial value. This creates a situation when large computers serve multiple users with vastly different levels of access. Furthermore, even within the same level of access, security considerations require compartmentalization of information when each user has to have access to only a small portion of the database.

The existing systems try to solve this situation by utilizing passwords and internal firewalls. As it was mentioned earlier, password-based systems and firewalls are not sufficient against computerized attacks. In practical terms it means that a legitimate user with a low level of access, utilizing hacking techniques from his station, potentially can break into even the most restricted areas of the database.

This problem can be solved by using the method of the present invention. A piece of information such as a file or a directory in a computer exists in cyber space. Accordingly, it has its cyber address, usually expressed as a directory and/or a file name which defines its position in a particular computer file system. This, in effect, represents the cyber coordinates of that piece of information within a computer.

As described earlier, information security can be provided if a system manager periodically changes the directories and/or file names in the system, i.e. the cyber addresses of the information, and notifies only appropriate parties of the current file names. This method would ensure that each user computer knows locations of only files to which it has legitimate access. Furthermore, a user would not even know of existence of the files to which he has no access.

To further strengthen the system and make it user-friendly, the user would have a personal directory similar to an address book, where only permanent directory and/or file names are accessible to him, while the variable side of the "address book" would be accessible only to the system manager and upgraded periodically. In this arrangement variable directory and/or file names can contain any required level of entropy, further increasing resistance to attacks from within the system. Additionally, an internal "router" or "filter" can also perform information security monitoring functions, detect intrusion attempts and issue appropriate alarms in real time.

Obviously, in order to ensure information security in such arrangement any computer-wide search by keywords or subject should be disabled and substituted with a search within specific clients' "address books".

The systems and methods described above allow for creation of a feasible infrastructure protection system such as a national or international infrastructure protection system. When detected at specific points cyber attacks are referred to such a system for further analysis and a possible action by law enforcement authorities.

What is claimed is:

1. A computer-implemented method for communicating with a mobile telephony device in a telecommunications system, the method comprising:
    assigning a valid variable cyber coordinate associated with a permanent identifier of the mobile telephony device, wherein the cyber coordinate defines a location or position of the mobile telephony device in a cyber space;
    determining if a received identifier, received during a communication attempt, with the mobile telephony device, based on the permanent identifier, is the valid variable cyber coordinate associated with the permanent identifier;
    enabling a communication with the mobile telephony device, if the received identifier is determined to be the valid variable cyber coordinate associated with the permanent identifier;
    not enabling a communication with the mobile telephony device, if the received identifier is determined not to be the valid variable cyber coordinate associated with the permanent identifier;
    changing the variable cyber coordinate; and
    repeating the determining and enabling steps to at least one of maintain uninterrupted communications with the mobile telephony device and maintain communications capabilities with the mobile telephony device.

2. The method of claim 1, further comprising: changing the valid variable cyber coordinate on a regular or irregular basis; and providing the changed valid variable cyber coordinate to devices or objects authorized to communicates with the mobile telephony device based on the permanent identifier.

3. The method of claim 1, wherein the variable cyber coordinate is based on a telephone number of the mobile telephony device.

4. The method of claim 1, wherein the permanent identifier is based on a name of a user of the mobile telephony device.

5. The method of claim 1, further comprising not responding to the communication attempt, with the mobile telephony device, based on the permanent identifier, if the received identifier is not the valid variable cyber coordinate associated with the permanent identifier.

6. The method of claim 1, further comprising: protecting the mobile telephony device against intrusion, including:
    granting access to the mobile telephony device, if the received identifier is the valid variable cyber coordinate associated with the permanent identifier; and
    denying access to the mobile telephony device, if the received identifier is not the valid variable cyber coordinate associated with the permanent identifier.

7. The method of claim 1, further comprising generating the valid variable cyber coordinate associated with the permanent identifier.

8. The method of claim 1, further comprising implementing the method with one or more computer systems configured to perform the steps recited in claim 1.

9. The method of claim 1, further comprising implementing the method with one or more devices or objects configured to perform the steps recited in claim 1.

10. The method of claim 1, further comprising implementing the method with a computer readable medium including computer readable instructions embedded thereon and configured to cause one or more processors to perform the steps recited in claim 1.

11. The method of claim 1, further comprising providing the valid variable cyber coordinate to other devices or objects authorized to communicate, with the mobile telephony device, based on the permanent identifier.

12. The method of claim 11, further comprising storing the valid variable cyber coordinate as a user-inaccessible identifier in the devices or objects authorized to communicates with the mobile telephony device, based on the permanent identifier.

13. The method of claim 11, wherein the authorized devices or objects are software devices or objects.

14. The method of claim 11, wherein the authorized devices or objects are hardware devices or objects.

15. The method of claim 1, further comprising assigning a new valid variable cyber coordinate to the mobile telephony device, if the received identifier is not the valid variable cyber coordinate associated with the permanent identifier.

16. The method of claim 15, further comprising providing the new valid variable cyber coordinate to devices or objects authorized to communicate, with the mobile telephony device, based on the permanent identifier.

17. The method of claim 15, further comprising:
    permitting a predetermined number of attempts to communicate with the mobile telephony device with a received identifier, before assigning the new valid variable cyber coordinate, and
    enabling a communication with the mobile telephony device, if during the predetermined number of attempts a received identifier is the valid variable cyber coordinate associated with the permanent identifier.

18. The method of claim 1, further comprising assigning a plurality of valid variable cyber coordinates associated with the permanent identifier to the mobile telephony device.

19. The method of claim 18, further comprising providing the plurality of the valid variable cyber coordinates to devices or objects authorized to communicate, with the mobile telephony device based on the permanent identifier.

20. The method of claim 18, further comprising:
determining if identifiers, received during a communication attempt, with the mobile telephony device, based on the permanent identifier, are the plurality of the valid variable cyber coordinates associated with the permanent identifier;
enabling a communication with the mobile telephony device, if the received identifiers are the valid variable cyber coordinates associated with the permanent identifier; and
not enabling a communication with the mobile telephony device, if the received identifiers are not the valid variable cyber coordinates associated with the permanent identifier.

21. The method of claim 18, further comprising:
changing the valid variable cyber coordinates on a regular or irregular basis; and
providing the changed valid variable cyber coordinates to devices or objects authorized to communicate with the mobile telephony device based on the permanent identifier.

* * * * *